(12) United States Patent  
Colson (10) Patent No.: US 8,793,777 B2
(45) Date of Patent: *Jul. 29, 2014

(54) VERIFICATION AND AUTHENTICATION SYSTEMS AND METHODS

(75) Inventor: Christen J. Colson, Alpharetta, GA (US)

(73) Assignee: Equifax, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/537,437

(22) Filed: Jun. 29, 2012

(65) Prior Publication Data

US 2012/0266227 A1  Oct. 18, 2012

Related U.S. Application Data

(63) Continuation of application No. 11/545,247, filed on Oct. 10, 2006, now Pat. No. 8,239,677.

(51) Int. Cl.

| | | |
|---|---|---|
| *G06F 7/04* | (2006.01) | |
| *G06F 17/00* | (2006.01) | |
| *G06F 12/14* | (2006.01) | |
| *H04L 29/06* | (2006.01) | |
| *H04L 9/32* | (2006.01) | |
| *G06F 21/00* | (2013.01) | |
| *G06Q 20/00* | (2012.01) | |
| *G06F 15/173* | (2006.01) | |
| *G06F 15/16* | (2006.01) | |
| *G06F 21/31* | (2013.01) | |
| *G06F 21/62* | (2013.01) | |
| *G06F 21/10* | (2013.01) | |
| *G06Q 20/38* | (2012.01) | |
| *G06Q 20/36* | (2012.01) | |
| *H04L 29/08* | (2006.01) | |

(52) U.S. Cl.
CPC ............ *G06F 21/31* (2013.01); *H04L 63/0272* (2013.01); *H04L 63/1416* (2013.01); *H04L 63/0428* (2013.01); *G06F 21/6218* (2013.01); *H04L 63/08* (2013.01); *H04L 9/3281* (2013.01); *G06F 21/10* (2013.01); *G06Q 20/382* (2013.01); *G06Q 20/3674* (2013.01); *H04L 29/06* (2013.01); *H04L 29/08072* (2013.01)

USPC .................. 726/7; 726/15; 726/22; 713/162; 713/165; 713/168; 713/170; 713/182; 705/51; 705/64; 705/67; 709/225; 709/228; 709/229

(58) Field of Classification Search
CPC ............ H04L 63/0272; H04L 63/1416; H04L 63/0428; H04L 63/08; H04L 9/3281; H04L 29/06; H04L 29/08072; G06F 21/31; G06F 21/6218; G06F 21/10; G06Q 20/382; G06Q 20/3674
USPC .......... 726/7, 15, 22; 713/162, 165, 168, 170, 713/182; 705/51, 64, 67; 709/225, 228, 229
See application file for complete search history.

(56) References Cited

U.S. PATENT DOCUMENTS

| | | |
|---|---|---|
| 4,528,442 A | 7/1985 | Endo |
| 4,661,658 A | 4/1987 | Matyas |
| 4,764,666 A | 8/1988 | Bergeron |
| 5,056,019 A | 10/1991 | Schultz et al. |
| 5,214,702 A | 5/1993 | Fischer |
| 5,235,165 A | 8/1993 | Sukegawa et al. |
| 5,311,594 A | 5/1994 | Penzias |
| 5,327,497 A | 7/1994 | Mooney et al. |
| 5,386,104 A | 1/1995 | Sime |
| 5,420,926 A | 5/1995 | Low et al. |
| 5,436,972 A | 7/1995 | Fischer |
| 5,442,342 A | 8/1995 | Kung |
| 5,533,123 A | 7/1996 | Force et al. |
| 5,577,120 A | 11/1996 | Penzias |
| 5,638,446 A | 6/1997 | Rubin |
| 5,655,077 A | 8/1997 | Jones et al. |
| 5,659,616 A | 8/1997 | Sudia |
| 5,668,876 A | 9/1997 | Falk et al. |
| 5,671,354 A | 9/1997 | Ito et al. |
| 5,677,955 A | 10/1997 | Doggett et al. |
| 5,684,950 A | 11/1997 | Dare et al. |
| 5,684,951 A | 11/1997 | Goldman et al. |
| 5,689,638 A | 11/1997 | Sadovsky |
| 5,706,427 A | 1/1998 | Tabuki |

| | | |
|---|---|---|
| 5,712,914 A | 1/1998 | Aucsmith et al. |
| 5,715,314 A | 2/1998 | Payne et al. |
| 5,732,400 A | 3/1998 | Mandler et al. |
| 5,748,738 A | 5/1998 | Bisbee et al. |
| 5,771,291 A | 6/1998 | Newton et al. |
| 5,774,525 A | 6/1998 | Kanevsky et al. |
| 5,818,936 A | 10/1998 | Mashayekhi |
| 5,819,029 A | 10/1998 | Edwards et al. |
| 5,819,092 A | 10/1998 | Ferguson et al. |
| 5,819,226 A | 10/1998 | Gopinathan et al. |
| 5,826,245 A | 10/1998 | Sandberg-Diment |
| 5,841,970 A | 11/1998 | Tabuki |
| 5,845,070 A | 12/1998 | Ikudome |
| 5,850,442 A | 12/1998 | Mufric |
| 5,864,665 A | 1/1999 | Tran |
| 5,870,473 A | 2/1999 | Boesch et al. |
| 5,870,721 A | 2/1999 | Norris |
| 5,872,844 A | 2/1999 | Yacobi |
| 5,872,917 A | 2/1999 | Hellman |
| 5,875,296 A | 2/1999 | Shi et al. |
| 5,878,138 A | 3/1999 | Yacobi |
| 5,884,289 A | 3/1999 | Anderson et al. |
| 5,893,098 A | 4/1999 | Peters et al. |
| 5,903,878 A | 5/1999 | Talati et al. |
| 5,936,541 A | 8/1999 | Stambler |
| 5,940,811 A | 8/1999 | Norris |
| 5,978,918 A | 11/1999 | Scholnick et al. |
| 5,987,134 A | 11/1999 | Shin et al. |
| 5,987,232 A | 11/1999 | Tabuki |
| 5,987,440 A | 11/1999 | O'Neil et al. |
| 5,991,882 A | 11/1999 | O'Connell |
| 6,005,935 A | 12/1999 | Civaniar |
| 6,006,333 A | 12/1999 | Nielsen |
| 6,014,650 A | 1/2000 | Zampese |
| 6,026,491 A | 2/2000 | Hiles |
| 6,029,149 A | 2/2000 | Dykstra et al. |
| 6,029,154 A | 2/2000 | Pettitt |
| 6,035,398 A | 3/2000 | Bjorn |
| 6,047,887 A | 4/2000 | Rosen |
| 6,055,638 A | 4/2000 | Pascal et al. |
| 6,070,241 A | 5/2000 | Edwards et al. |
| 6,088,451 A | 7/2000 | He et al. |
| 6,088,686 A | 7/2000 | Walker et al. |
| 6,092,196 A | 7/2000 | Reiche |
| 6,094,643 A | 7/2000 | Anderson et al. |
| 6,095,413 A | 8/2000 | Tetro et al. |
| 6,105,007 A | 8/2000 | Norris |
| 6,112,190 A | 8/2000 | Fletcher et al. |
| 6,119,103 A | 9/2000 | Basch |
| 6,122,624 A | 9/2000 | Tetro et al. |
| 6,122,625 A | 9/2000 | Rosen |
| 6,138,107 A | 10/2000 | Elgamal |
| 6,148,342 A | 11/2000 | Ho |
| 6,160,891 A | 12/2000 | Al-Salqan |
| 6,192,130 B1 | 2/2001 | Otway |
| 6,192,473 B1 | 2/2001 | Ryan, Jr. et al. |
| 6,233,565 B1 | 5/2001 | Lewis et al. |
| 6,263,447 B1 | 7/2001 | French et al. |
| 6,282,658 B2 | 8/2001 | French et al. |
| 6,295,291 B1 | 9/2001 | Larkins |
| 6,321,339 B1 | 11/2001 | French et al. |
| 6,405,175 B1 | 6/2002 | Ng |
| 6,460,076 B1 | 10/2002 | Srinivasan |
| 6,496,936 B1 | 12/2002 | French et al. |
| 6,567,850 B1 | 5/2003 | Freishtat et al. |
| 6,857,073 B2 | 2/2005 | French et al. |
| 6,871,220 B1 | 3/2005 | Rajan et al. |
| 7,092,821 B2 | 8/2006 | Mizrahi et al. |
| 7,181,518 B1 | 2/2007 | Matsumoto et al. |
| 7,234,156 B2 | 6/2007 | French et al. |
| 8,239,677 B2 | 8/2012 | Colson |
| 2001/0005847 A1 | 6/2001 | Wachtel |
| 2001/0011245 A1 | 8/2001 | Duhon |
| 2002/0104006 A1* | 8/2002 | Boate et al. ............ 713/186 |
| 2002/0157029 A1 | 10/2002 | French et al. |
| 2003/0033526 A1 | 2/2003 | French et al. |
| 2003/0083893 A1 | 5/2003 | Aliffi |
| 2003/0154406 A1 | 8/2003 | Honarvar et al. |
| 2004/0143550 A1* | 7/2004 | Creamer et al. ............ 705/41 |
| 2005/0021543 A1 | 1/2005 | Schmitt et al. |
| 2005/0097320 A1 | 5/2005 | Golan et al. |
| 2005/0279827 A1* | 12/2005 | Mascavage et al. .......... 235/380 |
| 2006/0036868 A1* | 2/2006 | Cicchitto ................. 713/182 |
| 2006/0126654 A1 | 6/2006 | Nilakantan et al. |
| 2006/0156385 A1* | 7/2006 | Chiviendacz et al. ............ 726/2 |
| 2006/0161435 A1 | 7/2006 | Atef et al. |
| 2006/0177061 A1 | 8/2006 | Orsini et al. |
| 2007/0033139 A1 | 2/2007 | Handler |
| 2007/0271138 A1 | 11/2007 | Van Der Linden et al. |
| 2008/0086759 A1 | 4/2008 | Colson et al. |

FOREIGN PATENT DOCUMENTS

| | | |
|---|---|---|
| CA | 2312641 | 12/2000 |
| EP | 0534679 | 3/1993 |
| JP | 03067355 | 3/1991 |
| WO | 9956495 | 11/1999 |
| WO | 9960481 | 11/1999 |
| WO | 9960482 | 11/1999 |
| WO | 9960483 | 11/1999 |
| WO | 0025251 | 5/2000 |
| WO | 0122292 | 3/2001 |
| WO | 01/73623 | 10/2001 |
| WO | 03038718 | 5/2003 |
| WO | 2008045667 | 4/2008 |

OTHER PUBLICATIONS msdn online Web Workshop Microsoft Certificate Server, Apr. 17, 1997, pp. 1-8.
Public Forum Transcript—San Jose, California—Social Security Administration, Public Form #3, held at San Jose State University, Student Union, Room 211, San Jose California, May 28, 1997, pp. 1-75 (sepcifically pp. 55-58).
United States Securities and Exchange Commission, Form 10-K Annual Report Pursuant to Section 13 or 15(d) of the Securities Exchange Act of 1934 for the fiscal year ended Dec. 31, 1996.
Institute of Electrical and Electronics Engineers Ed, "Unix Security in a Supercomputing Environment", Proceedings of the Supercomputing Conference, Reno, New York, IEEE, Nov. 1989, vol. Conf. 2, pp. 693-698.
Verisign Certification Practice Statement in Support of Verisign's Public Certification Services, Class 1-3 Digital IDS Certificates, Version 1.0, Jul. 25, 1996.
Verisign webpage, Verisign, Inc., 1998, pp. 1-5.
Horne et al., "Escrow Services and Incentives in Peer-To-Peer Networks", BNS, Abstract No. XP-002248537, pp. 1-10 (2110).
Khare , "So-so top-level review of crypto role in IS", Sep. 4, 1996, pp. 1-7.
Muscisno et al., "Forms in HTML", HTML The Definite Guide, XP002304062, Jun. 1996, pp. 229-262.
U.S. Appl. No. 11/545,247 , "Office Action", Dec. 30, 2009, 23 pages.
U.S. Appl. No. 11/545,247 , "Response to Office Action", Apr. 30, 2010, 21 pages.
U.S. Appl. No. 11/545,247 , "Final Office Action", Jul. 20, 2010, 23 pages.
U.S. Appl. No. 11/545,247 , "Request for Continued Examination and Response", Nov. 22, 2010, 22 pages.
U.S. Appl. No. 11/545,247 , "Office Action", Jan. 21, 2011, 23 pages.
U.S. Appl. No. 11/545,247 , "Response to Office Action", Apr. 20, 2011, 25 pages.
U.S. Appl. No. 11/545,247 , "Final Office Action", Jul. 6, 2011, 28 pages.
U.S. Appl. No. 11/545,247 , "Response to Final Office Action", Sep. 15, 2011, 12 pages.
U.S. Appl. No. 11/545,247 , "Office Action", Oct. 3, 2011, 20 pages.
U.S. Appl. No. 11/545,247 , "Response to Office Action", Feb. 3, 2012, 20 pages.
U.S. Appl. No. 11/545,247 , "Notice of Allowance", Apr. 6, 2012, 7 pages.
European Patent Application No. 07842933.9 , "Response to Rule 161 EPC Communication", Apr. 21, 2009, 16 pages.

European Patent Application No. 07842933.9, "Rule 63(1) EPC Communication", Jul. 26, 2010, 3 pages.
European Patent Application No. 07842933.9, "Response to Rule 63(1) EPC Communication", Oct. 4, 2010, 11 pages.
European Patent Application No. 07842933.9, "Extended Search Report", Jan. 30, 2012, 7 pages.
European Patent Application No. 07842933.9, "Response to Extended Search Report", Aug. 17, 2012, 30 pages.
International Patent Application No. PCT/US07/79105, "International Search Report and Written Opinion", Jun. 12, 2008, 12 pages.
International Patent Application No. PCT/US07/79105, "International Preliminary Report on Patentability", Apr. 23, 2009, 9 pages.
International Patent Application No. PCT/US1999/011196, "International Search Report", Jul. 9, 1999.
International Patent Application No. PCT/US2007/007915, "International Preliminary Report on Patentability and Written Opinion", Apr. 15, 2009.
Canadian Patent Application No. 2,664,510, "Office Action", mailed Jan. 28, 2014 (3 pages).

\* cited by examiner

*Primary Examiner* — Aravind Moorthy (74) *Attorney, Agent, or Firm* — Kilpatrick Townsend & Stockton LLP (57) ABSTRACT

Embodiments of the present invention provide verification and/or authentication service engines that provide a customizable solution that can be "dialed" based on the risk level assigned to individual or grouped applications. The systems can also incorporate internal and external sources of data used to verify information provided by the user. It is dynamic and can pull information from a myriad of sources during the verification process, enabling credit reporting agencies (e.g., Equifax and others), FSPs, and other service providers to facilitate real-time approval and access to products and services.

20 Claims, 3 Drawing Sheets

VERIFICATION AND AUTHENTICATION SYSTEMS AND METHODS

CROSS-REFERENCE TO RELATED APPLICATIONS

This application is a continuation of U.S. patent application Ser. No. 11/545,247, filed Oct. 10, 2006, allowed, which is incorporated herein by reference.

FIELD OF THE INVENTION

Embodiments of the invention relate to verifying and authenticating the identity of network users, and particularly relate to systems and methods for setting desired risk or verification levels, for using information from a plurality of sources, and for verifying or authenticating the identity of small businesses and principals or other employees.

BACKGROUND

A variety of networks are used today. Computer networks include local area networks (LANs), metropolitan area networks (MANs), wide area networks (WANs), intranets, the Internet, and other types of networks. Communication networks include those for conventional telephone service, cellular networks of different varieties, paging services, and others. Networks are used for many purposes, including to communicate, to access data, and to execute transactions. It is often necessary, for security and other reasons, to confirm and/or verify the identity of a user before permitting access to data or a transaction to occur on the network. The user may be an individual, although it is also common for small businesses to access websites at which they need to have their identity verified.

"Verification" is the process of confirming the identity of a person, entity, and/or device at the other end of a channel. It is important in many industries, for example financial service providers (FSPs), to establish whether or not the user on the other end is who they claim to be. FSPs (banking, securities, brokerage, and insurance industries) have traditionally relied on face-to-face communications, but with the advent of identity management, tokens, bio-metrics, and digital signature technology, face-to-face communication as a manner of doing business is slowly becoming the exception rather than the norm. However, the obstacle of distance as it relates to electronic interaction will be overcome only when a means to verify individuals, entities, and businesses is established.

Establishing verification at the beginning of an online process is a particularly important step and has become one of the most important trust issues for online businesses. Even in the most robust organizations, verification is a dynamic and evolving business risk because fraud continues to threaten online transactions and erode consumer confidence in online services, especially financial services. Beyond simple phishing scams, new threats such as man-in-the-middle attacks, bots, keystroke logging, and remote administrator tools are appearing. While some of these threats can be minimized or eliminated with common sense, others are stealth, sophisticated, and undetectable. The Federal Trade Commission estimates that millions of Americans have had their personal information pilfered and misused in some way or another every year, costing consumers and businesses billions annually. Furthermore, some projections estimate that online U.S. commerce growth will be lowered materially in coming years, as service providers struggle to find the right verification solutions that do not inconvenience consumers and are cost-effective to implement.

Another driver of verification is the recently mandated Federal Financial Institutions Examination Council (FFIEC) guidelines for financial institutions. While they are not regulations, the FFIEC expects all FSPs to comply with the guidance by the end of 2006. It mandates that FSPs have an effective security program that prevents unauthorized access and only permits authorized users to access systems and data. With the new guidelines, FSPs have been forced to rethink their online verification and authentication approaches. They need solutions that apply across their entire organization. They need the ability to define requirements that are applicable for the enterprise as a whole. They need solutions that will help them become compliant and meet their business needs so that they can fully use electronic channels and grow their business and revenue.

Verifying new users is different from authenticating existing users. Confirming the identity of a user can be a key aspect to improving overall security, not only in operations which require authentication of users, but also where verification is required. As a general matter, authentication relates more to confirming the identity of an established user and/or a user with an existing account, while verification relates more to confirming identity of a user who or which has not been established and/or who or which does not have an existing account or relationship. Although there may be, to some extent, an overlap in definition of verification and authentication, or in the status of a user whose identity needs to be confirmed, it is also generally true that to date, security, hardware, software, and token companies have focused on providing authentication services more than verification services.

There are some solutions in the marketplace that offer verification, but they are primarily industry-specific. For example, solutions for FSPs may require the user to make an account-to-account funds transfer. Another example is Equifax eID solutions, which requires the end user to have a thorough understanding of his/her financial and personal information. While both of these options may meet the needs of perspective target markets, they do not offer a solution that can always be used by all markets. Accordingly, additional verification/authentication engines with more sophisticated features and options are needed.

As a practical matter, in the architecture or design of a workable verification and/or authentication solution, it is preferable to recognize that once a user has initially been verified, when he or she returns to a website (e.g., to conduct additional business, access additional applications, platforms, or conduct transactions), his or her identity will need to be authenticated or re-confirmed every time he/she returns, or some equivalent security mechanism will need to be employed. Such repeat visits are different in some ways from verifying a new user. With respect to computer network authentication, one approach is user-specific passwords. Passwords provide some level of protection, but they are not fail-safe. Passwords can be vulnerable because users often share them or they can be easy to guess. Even if kept private, someone who wants to obtain a password badly enough often can—using random generators, keyboard monitors, or other techniques. Moreover, when dealing with unknown users such as people who want to conduct an electronic transaction over the Internet and who have not yet been verified, ad hoc passwords are not practical.

Various non-password schemes exist that perform some level of authentication and/or verification before authorizing transactions or permitting access to data. These systems generally require a user to provide a sampling of basic identification information such as name, date of birth, social security number, address, telephone number, and/or driver's license information. This sort of information, sometimes known as "wallet-type information," is compared to known data, such as a credit file, to determine how well the user's input matches that source.

For various reasons, one-level authentication schemes are not completely reliable. In some instances, a user who provides accurate identification information may not be authenticated. This may occur, for example, because the user enters a nickname rather than a proper name, and the authentication process does not check for a nickname or other variation. As a result, a user who should be entitled to access information or perform a transaction cannot do so. Other inconsistencies may trigger a false negative, and often the false negative (perhaps after a set number of tries) will terminate the transaction without further processing or corrective querying. In other instances, a user who supplies fraudulent information may be authenticated. This may occur when lost or stolen wallet-type information is entered by an unauthorized user. Other situations may also lead to a false positive result. Both false positives and false negatives are undesirable.

Some attempts to address these problems have included verifying consumers, via static data, for retail applications. An example of this approach is when a consumer applies for a store credit card on-site and is connected on the phone with a credit reporting agency to answer a series of questions that are in the consumer's credit history file for an automatic approval or denial of store credit. Other attempts have included providing a first level authentication that may include queries related to wallet-type information, and if those questions are answered correctly, it may then proceed to a second level authentication that includes questions related to non-wallet type information such as mortgage account information, lender, merchant account information, and so forth. Once the end user attempting to access a system has answered an appropriate number of questions correctly, access may be granted or denied. An example of such systems and processes is described in U.S. Pat. Nos. 6,857,073 and 6,263,447, incorporated herein by reference. Such systems and processes can draw from one or more types of databases, such as credit related databases, postal service databases, telecommunication databases, and other types of data.

Other attempts have included using biometric data, for example a fingerprint captured in digital or analog form, a retinal or iris scan, finger or hand geometry matches, or handwriting recognition or voice recognition. These solutions may be useful in some instances, but they may not always be practical due to various technology constraints.

An additional problem experienced by some financial institutions is verifying the identity of small businesses. Small businesses may have shorter life spans than large business, which can make it more difficult for systems to accumulate, store, and access data about the credit history of the business. Small businesses may also not have sufficient assets on which a financial institution will extend credit. Often, the credit may be extended to the small business owner(s) as a personal loan. Although that loan is effectively part of the financial landscape of the small business, the loan would not be reflected as a part of the small business credit history file. As such, lenders and other financial institutions may have more difficulty when attempting to verify the identity of a small business because the owner(s) or principal(s) may also need to be verified and their credit history and other data checked, etc. Lending to this difficulty could be an instance in which multiple banks are involved.

For example, a small business may bank with Bank 1; one owner of the small business may obtain with Bank 2 a personal loan to infuse into the business; and a second owner may obtain a similar personal loan with Bank 3. Bank 1 may wish to verify the business, but the business may not have a credit history with which Bank 1 can easily cross-check and verify data. Accordingly, it is desirable to provide a verification/authentication engine that call pull data from multiple sources, in this example, from Banks 2 and 3 (to the extent that they share publicly available information on websites such as the Small Business Financial Exchange). Such systems are disclosed in U.S. Ser. No. 10/021,468, filed on Oct. 29, 2001, titled "System and Method for Facilitating Receprocative Small Business Financial Information Exchange," which is incorporated herein by this reference.

It is also desirable to provide an entity (in this case, Bank 1) with the option to change, "dial," or assign at least different risk or verification levels and sources of data required for authentication or verification of users who seek to conduct online activities. For example, if the small business would like to obtain a loan of $50,000, online activities to conduct such a transaction might require one level of verification and/or authentication which is based on presentation and scoring of questions from a first set of data or databases. However, a loan of ten million dollars could require a different and higher level of verification and/or authentication based on presentation and scoring of questions from another set of data or databases, in order, among other things, to apply more stringent, rigorous and/or more difficult authentication or verification scrutiny.

Because technology is continually changing, and the need for adequate security is crucial, a dynamic verification/authentication engine that meets specific businesses' needs and regulatory compliance guidelines is necessary. It is also necessary to provide a system that enables businesses to establish their own risk assessments according to their internal practices and principles. Accordingly, there are needs for further verification and authentication systems and methods that can be used across industries for multiple purposes.

SUMMARY

Verification and authentication service engines according to various embodiments of this invention provide a customizable solution, preferably for online transactions, which allow an organization to increase the security of access to its platforms and applications/services by presenting certain questions that may be drawn from multiple sources and then scoring answers to those questions. (For the purposes of this application, accessing platforms, services, applications, or conducting any other type of business may be referred to as a "transaction," which is understood to mean exchange of information, a financial transaction, information access, or any other event where authentication, verification, or other access control or security measures may be appropriate.) Those who seek to control access to their platforms or services during transactions can participate in the nature and difficulty of such questions by (a) specifying or helping to specify at least one or more of the sources of data from which the questions are drawn and (b) specifying or helping to specify the nature and difficulty of the questions. (Other parameters, such as the channel through which the user accesses the platforms and services, may also be specified, as discussed further below.) Such systems and processes allow such customers to modulate the nature of questions and scoring in order to control the level of difficulty, but also to control the level of expense (because access to some data is more expensive than access to other data). For example, for a low stakes potential transaction, such a customer may wish to spend a minimal amount on the authentication step, and so is willing to present questions for authentication or verification that are drawn from a modestly inexpensive database like a telecommunications database or a postal service database. In other cases, where the stakes are higher, the customer may desire extra security in the form of questions drawn from credit reporting databases that are less subject to unauthorized access, but which could be more expensive. In this sense, the customer can have some control over the authentication or verification process, similar in some ways to the way that a dial on a washing machine gives a user options to launder fabric using various temperatures, quantities of water, and cycle times.

One object of certain embodiments of the invention is to harvest existing data sources and identity-related solutions and make them accessible as web services in a manner where the customer has some input as to the nature and difficulty of questions presented in such solutions. This will allow a customer or vendor (also referred to as the entity using the verification/authentication engine) to verify and/or authenticate users, consumers and business, as well as employees of businesses, that are attempting to gain access to its vendor information technology systems in a way that they can at least partially control or modulate.

Another object of certain embodiments of the invention is to permit security token manufacturers and authentication solution providers the ability to integrate with the verification/authentication engine so that verification and/or authentication of identity can be assured prior to the distribution of security devices, ensuring their usage across multiple, perhaps unrelated, sites.

Another object of certain embodiments of the invention is to provide a solution that can be sold as a verification and/or authentication engine or service to any industry or business, large or small, that needs to verify or authenticate an individual or business prior to granting access to a system or data.

A further object of certain embodiments of the invention is to provide businesses with the ability to set their risk or verification level and accompanying security to match verification and/or authentication needs across their entire enterprise.

A further object of certain embodiments of the invention is to provide businesses with the capability to add their own data sources into the verification/authentication engine to strengthen the process and their confidence level. With a dynamic rules-based infrastructure, customers or vendors can add various verification and/or authentication services and data to support their networks easily and inexpensively.

A further object of certain embodiments of the invention is to provide multiple channel offerings (including one or more of the internet, an intranet, e-mail, instant messaging or other channels such as one or more of phone or voice systems, cell phones such as a Blackberry®, ATM, kiosk, scanner, point of sale terminal, mobile systems, handheld devices, pocket PC, wireless devices, or any other platform) for authentication and/or verification services.

Another object of certain embodiments of the invention is to provide a single verification and/or authentication solution that can be customized to meet the needs of small, medium, and large enterprises, and that can reduce capital and operating expenses per user.

A further object of certain embodiments of the invention is to provide a system that can recognize whether the user is an individual or a business and (at least) price the verification/authentication engine access accordingly.

On a broad level, verification and authentication systems and processes according to some embodiments of the invention receive an inquiry from a customer or vendor regarding a potential user who is attempting to access a particular application or transaction. Depending on the nature of the application or transaction, the level of risk involved and/or other criteria, the customer or vendor can help select at least one or more of the types and/or sources of data that will be used for authentication or verification, as well as the nature, number, difficulty and/or other parameters used to determine which questions will be presented for authentication and/or verification. The engine can score answers to the questions, preferably according to parameters selected by the customer, and can send advice or a decision to the customer or vendor about whether to grant or deny access.

Some aspects of the invention relate to a method of controlling access by a user (whether online or through any other channel) to vendor information technology systems using a verification/authentication engine, comprising:
   (a) receiving an inquiry from a vendor system to verify a particular user for a particular transaction, wherein the vendor has assigned the particular transaction a level of risk;
   (b) wherein the vendor has specified an appropriate verification level to meet the assigned level of risk, comprising specifying a plurality of data sources which contain information about the user;
   (c) querying the user, using questions generated based on data from at least two of the data sources;
   (d) determining the extent to which the user correctly answers the questions; and
   (e) determining whether to grant or deny access by the user to the vendor information technology systems based on the extent to which the user correctly answers the questions.

As used above and throughout this application, the term "question" means, in addition to the typical question and answer scenario, the use of voice verification, fingerprint scans, biometrics, or any other identifying piece of data that may be obtained and verified and/or authenticated or answered by a user. For example, the "question" at issue could be whether or not the user's fingerprint matches with the fingerprint on file, and the "answer" could be the fingerprint itself, and so forth.

Other aspects relate to a verification./authentication engine adapted to control access by a user online to vendor information technology systems, comprising:
   (a) a risk-setting option, wherein the vendor specifies an appropriate risk level for verifying and/or authenticating the user; and
   (b) a data source setting option, wherein the vendor specifies at least two data sources to be searched in order to generate verification/authentication questions.

DETAILED DESCRIPTION

The level of verification and/or authentication should preferably be proportionate to the risks associated with the transaction for which verification or authentication is being sought; for example, various levels of access might require different levels of verification or authentication. These levels should preferably be dynamic and match the corresponding request at the time of the request. The sources from which verification or authentication information is obtained may also be varied, depending upon the risk level assigned. This can help alleviate risks from pulling all verification and authentication queries from one source only.

In use, once a user is granted access at a particular risk level (e.g., Level 2), then the user should have access to all levels requiring the same or a lower risk level (e.g., Level 1). In this example, once a user is verified and/or authenticated at Level 2, he or she should have access to all applications, services, transactions that are at Level 1, as well as others that are designated at the same risk level in Level 2. This feature may be configurable, so that the vendor can select this option as a default or require users to be verified/authenticated for each and every service or transaction by setting its own parameters. In fact, most of the features described for the systems discussed in this application may all be configurable, so that the vendor can customize the system as needed for particular uses or users. It can also help a vendor or customer using the verification/authentication engine to appropriately price the service—for example, a $10 transaction does not need the same verification as a million dollar transaction, and thus, more expensive databases need not be queried. Accordingly, vendors may wish to control the sources used to verify their users for many reasons, including price control. They may wish to pull information from their own data sources to lower costs. (It should be understood that where the term "verification" is used in this application, it is intended to refer to the act of confirming a potential user's identity, and thus, the term authentication may be equally applicable, and vice versa. It should also be understood that the terms "vendor" or "customer" are intended to refer to any entity using the verification/authentication services described in this application.)

Verification/authentication service engines according to various embodiments of this invention provide a customizable solution that can be "dialed" based on the risk level assigned to individual or grouped applications that may be accessed during a transaction. In certain embodiments, the system integrates a rules-based engine so that the appropriate rules can be instituted ("dialed") according to the risk assigned to a transaction. The rules-based engine may also provide an opportunity to customize locally based on segment, geographic location, and type of service requested. In short, the "dial" approach permits customers to access solutions in any market and at any location. It also permits customers to access products made available on specific websites that are linked to the system (e.g., the EquifaxDirect website, or any other website that is linked to the system). It also allows the verification/authentication engine to waterfall, or dial, the appropriate risk and its accompanying security/verification requirements.

Although embodiments are described as dialing or waterfalling to separate, discrete databases, it is conceivable that a single co-mingled database may contain compiled information from various data sources, but stored in one location. This co-mingled database may be separated by content or by risk level.

Embodiments of the present invention provide a verification/authentication engine that can be used by all industries. They enable an entity using the engine to establish its own risk assessments according to its specific practices and principles. This is the rules-based option of certain embodiments. First, the vendor (or customer or entity) assigns a level of risk to each application/transaction that it offers. For example, the vendor could be an investment or banking site that needs to protects its information and verify or authenticate users when users attempt to access the site or certain platforms or applications on the site. The vendor could then specify an appropriate verification level to meet the assigned level of risk. For example, for a transaction that requires a very high level of certainty about the identity of a user, also referred to a high level of scrutiny (e.g., low risk), the verification level could be set to require data to be pulled from more sources (e.g., X, Y, and Z) and to ask more questions per data source. As applications or transactions move up the risk ladder, the questions presented may become more difficult and varied. This could be a specific "verification level" that is specified by the vendor. It is also possible for the vendor to set a risk level based on the channel that is being used by the user. For example, if point of sale terminals or kiosks present a greater risk than on-line access, point of sale/kiosk transactions can be designed at a higher verification level.

Then, when the entity's system queries the verification/authentication engine with a new user's information, the verification/authentication engine is able to "dial" to the appropriate verification level to meet that associated level of risk. In short, the "dial" can also be set to query certain data sources, databases, or information sources, and to ask a certain number of questions from each database or information source, specific examples of which are described below. These data sources and questions are configurable and can support a change in workflow. Depending upon the nature of the risk level assigned, there may be a specific number of questions that need to be answered correctly in order for a user to obtain access to a site, or the difficulty of the questions may vary, depending upon pre-set levels. The questions and answers may come from multiple data sources, for example, small business information exchanges such as the Small Business Financial Exchange (SBFE) and Small Business Exchange SBX databases. Other non-limiting examples include credit reporting databases, mail databases (e.g., MetroMail, PostalSoft); driver's license databases; online phone books; who/where websites; reunion, high school or college databases; frequent flier databases; investment and retirement account information; insurance carrier information; medical information; passport data or other governmental information; phone company or utility company information; bill pay sites; automobile registration sites; funeral databases; databases internal to the vendor; and any other commercially available or internal databases.

If a product or service risk level requires data from an additional source, the verification/authentication engine can waterfall to that source. In the small business verification example, if a small business is in need of verification and no data exists within the SBFE and/or SBX databases, or if the file is too thin, then the verification/authentication solution can turn to existing data sources to supplement the process. Sources can be existing data sources within a credit reporting company (such as Equifax), or through relationships, like demand deposit accounts (DDA) data, or third parties such as Dunn & Bradstreet. This ensures a higher automated verification success rate, and also increases the confidence level and accuracy of that verification.

For example, embodiments of the verification/authentication engine can "dial" to third party sources of data provided by the customer, partners and/or others to provide a large file (or "data bank") from which to choose questions to prove ownership and verify/authenticate identity. The "dial" enables questions that are presented to the user to automatically incorporate questions and answers that are applicable to the risk assigned to the transactions. Based on the product and/or service that the user is requesting access to, multiple data sources can be incorporated into the verification process. Therefore, if a file cannot provide enough information (questions & answers), the system can automatically waterfall to backup or additional sources. For instance, the verification/authentication engine could be set to first search credit reporting agency data (e.g., mortgage holder and amount, car payment and amount, credit card balances, which store credit cards are held, etc.), but depending upon the risk level that is dialed for the particular transaction, it may then also select and pull data from other additional sources, whether external or internal. It is possible for the sources or databases searched during this waterfall or backup data searching step to be specifically selected by the entity engaging the verification/authentication engine services.

For example, the verification/authentication that is conducted at a point of sale in a store or gas station when a user swipes a credit card (e.g., with a zip code requested prior to verification) should likely be different than the verification/authentication that is conducted at a used car business before the purchaser can drive away with the car. Because the purchase amounts are different and there is more risk involved, more data may be needed from the car purchaser. Additionally, it may be the case that the zip code entry is not enough verification for some stores or gas stations, e.g., if the purchase amount exceeds X dollars or if there has been a rash of fake credit card uses in the area, the vendor may wish to set a higher level of security and require the input of more information from selected sources. In those instances, the vendor may wish to implement systems such as those described herein in order to pull data from other sources and identify certain tolerated risk levels.

Allowing the vendor or other entity to identify and select the sources it wishes to verify against and matching those applications and services (collectively "transactions") against the appropriate pre-set security levels can give entities and their users more confidence in the verification/authentication process. It also allows the entity to use its own data sources that are linked to its systems, so that it can "dial" into its own internal sources, or a mix of both internal and external data sources. It further allows the entity to decide on its price point; for example, it may wish to initially search less expensive search engines for lower levels of risk (e.g., perhaps internal databases, which are free to the vendor), and only access more expensive searches for transactions where the assigned risk requires a higher verification and/or authentication certainty.

Embodiments of this invention can be provided with the ability to prioritize data elements, so if a particular piece of data can be obtained from more than one source, the engine can specify which data source can be used. For example, if a driver's license number can be obtained from two different data sources, the engine can be configurable to specify which source to use. In some embodiments, the engine can be configured to obtain the data from the least expensive source.

In short, as a user moves up the risk level and transactions require a higher certainty, the verification/authentication engine "dials" up a level too. If the risk associated with the transaction calls for real-time online verification, the verification/authentication engine can provide that as well. There may be instances, applications, or transactions when the vendor chooses to use real-time data for a particularly high certainty level. For example, if someone has just made a purchase at Grocery Store A, the engine could pull that real-time data and ask about what was purchased within a few seconds or minutes after the purchase.

In the context of electronic commerce, lower risk transactions such as relatively small purchases may not require a high level of assigned risk. On the other hand, more sensitive or greater risk transactions such as large purchases or sensitive data access may require a more thorough verification and/or authentication process at a higher level of certainty regarding assigned risk. Features of embodiments of the invention avoid the drawbacks that could be encountered by requiring every transaction to be verified and/or authenticated at the same level of certainty (e.g., a $10 wire transfer compared to a million dollar loan) by enabling different levels of verification to be performed based on the level of security desired, reducing costs and unnecessary use of system resources.

As an example, consider a washing machine analogy. If a customer is requesting a $50,000 wire transfer, that could be considered a "full load" for which a series of hard questions should be asked from sources x, y, and z. By contrast, if a customer is requesting a $25 payment, that could be considered a "light load" for which a series of less difficult questions from less expensive data sources could be queried. The entity or vendor using the verification/authentication engine is provided with the opportunity to pay differently for the different loads in the washing machine. Typically, different data sources have different costs. Thus, the pricing for the verification/authentication engine service will typically be different depending upon which sources the vendor has identified as part of the "dial." Additionally, another benefit of the dial concept is that the customer requesting the $25 payment is not given the "third degree" before being able to complete the transaction.

In some embodiments, the configuration of the dial can be customized at the administration level, and it is based on security requirements and associated risks. For example, if a first FSP would like to set the risk level for a potential customer to withdraw $1-$10,000 from an account at Risk Level 1, and a withdrawal of $10,0001-$50,000 at Risk Level 2, and so forth, it may. It may want Risk Level 1 questions to come from an internal database and default to free, public databases if necessary to obtain more questions to complete the process, and Risk Level 2 questions to be pulled from a credit reporting agency site. A second FSP, however, may wish to set its risk levels differently, e.g. $1-$75,000 at Risk Level 1 and $75,000-$200,000 at Risk Level 2. Likewise, it may also select different information sources from which to pull the data for the queries to the user. The dial setting function allows the administrator at each FSP to set its risk levels at the desired level. In this example, each FSP was also able to customize its desired additional information sources. In addition to providing more customization, this option may also help the entity control its costs.

Another available option is to allow the vendor to identify the form in which the questions are asked, depending upon the communication channel. For example, if the transaction is online with a computer, the entire keyboard is available for the user to type in a detailed answer to a question. In this situation, the form of the question is not a limiting issue. However, if a point of sale terminal only has a number keypad, then the questions may need to be framed in a "yes/no" manner (is your address 123 Ivy Lane?) or in a number format (e.g., what are the last 7 digits of your driver's license number?). By contrast, if a fingerprint scan terminal is available (e.g., at a pay-by-touch terminal), then fingerprint data may be used, and so forth. In short, the concept is that the questions and answers (in the broadest sense of the terms) will be dictated by the channel that the user is using. If the channel being used has a large screen with room for text, a longer question can be used, but if the channel being used has only a small screen with limited space, the form of the question and answer will likely need to be modified accordingly.

The various channels could include communication through the internet, an intranet, e-mail, instant messaging or other methods such as phone or voice systems, cell phones such as a Blackberry®, ATM, kiosk, scanner, point of sale terminal, mobile systems, handheld devices, pocket PC, or wireless devices. Any other communication channels can be used and are considered within the scope of this invention.

It should also be noted that if a user cannot be verified using the preferred channel (e.g. the user is online and has answered too many questions incorrectly and is thus locked out of the system), then the verification/authentication system may default to a manual system. In the above example, once the user has been locked out, he or she could be prompted to call the vendor to complete the verification/authentication process over the phone. The vendor could still have the questions and answers on a screen and simply ask the user to confirm the information or answer the questions.

The weakness in the some of the existing solutions is that they are static. Therefore, if someone were to gain unauthorized access to credit reports, the entire solution could be compromised. However, because embodiments of the verification/authentication engine described herein are dynamic and do not use just consumer credit report data, they are much more difficult—and perhaps impossible—to be compromised.

Figure 1:
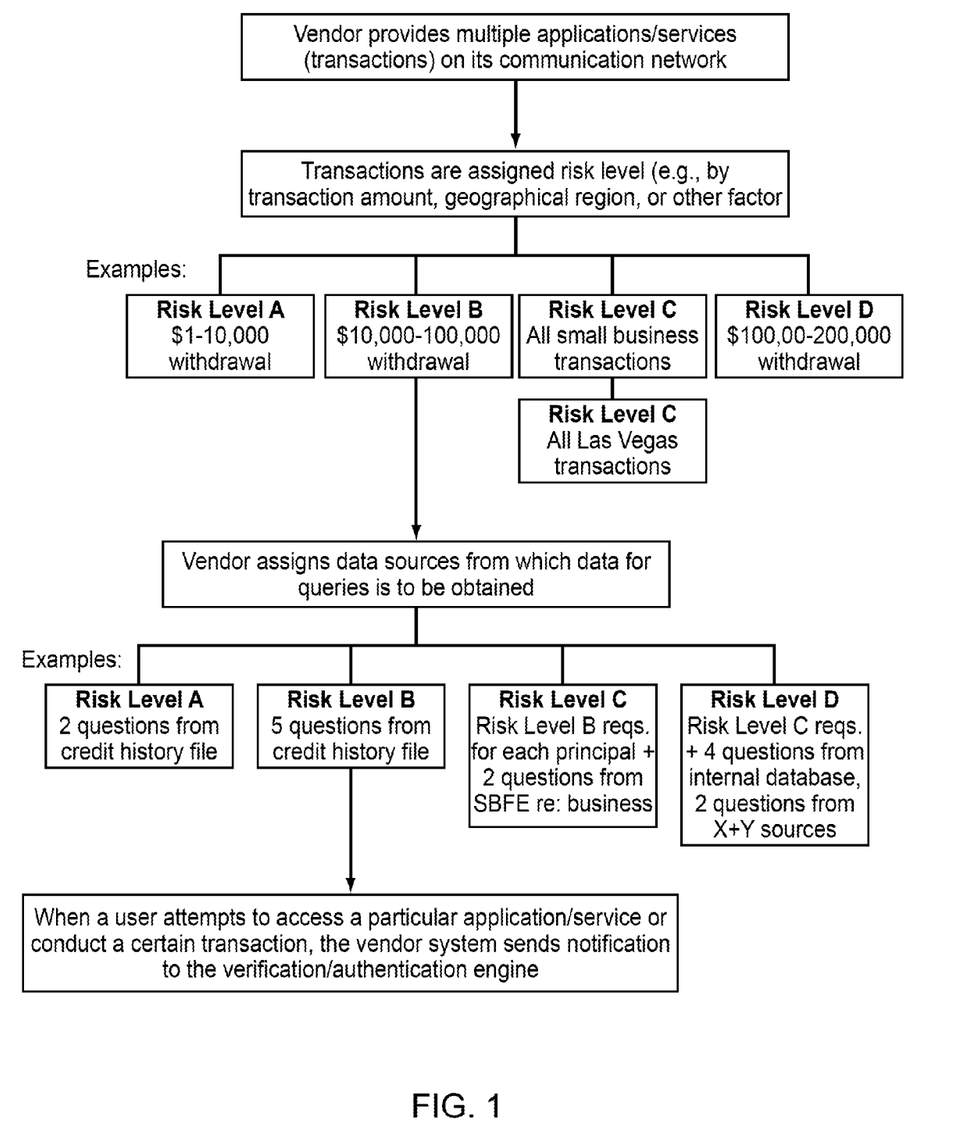
FIG. 1 is a flow chart of one form of process flow for assigning a risk level to particular applications on a communications network according to one embodiment of the invention.

A general example of the risk and information source setting process is shown in FIG. 1. A vendor or client or server network administrator can assign risk levels to various transactions. (Authentication and accompanying permissions can also be defined during the set-up process.) For example, a wire transfer between accounts of the same account holder may be a Risk Level A, whereas a wire transfer to a different account holder's account may be a Risk Level D. Other examples with drawal amounts are shown in the Figures.

Figure 2:
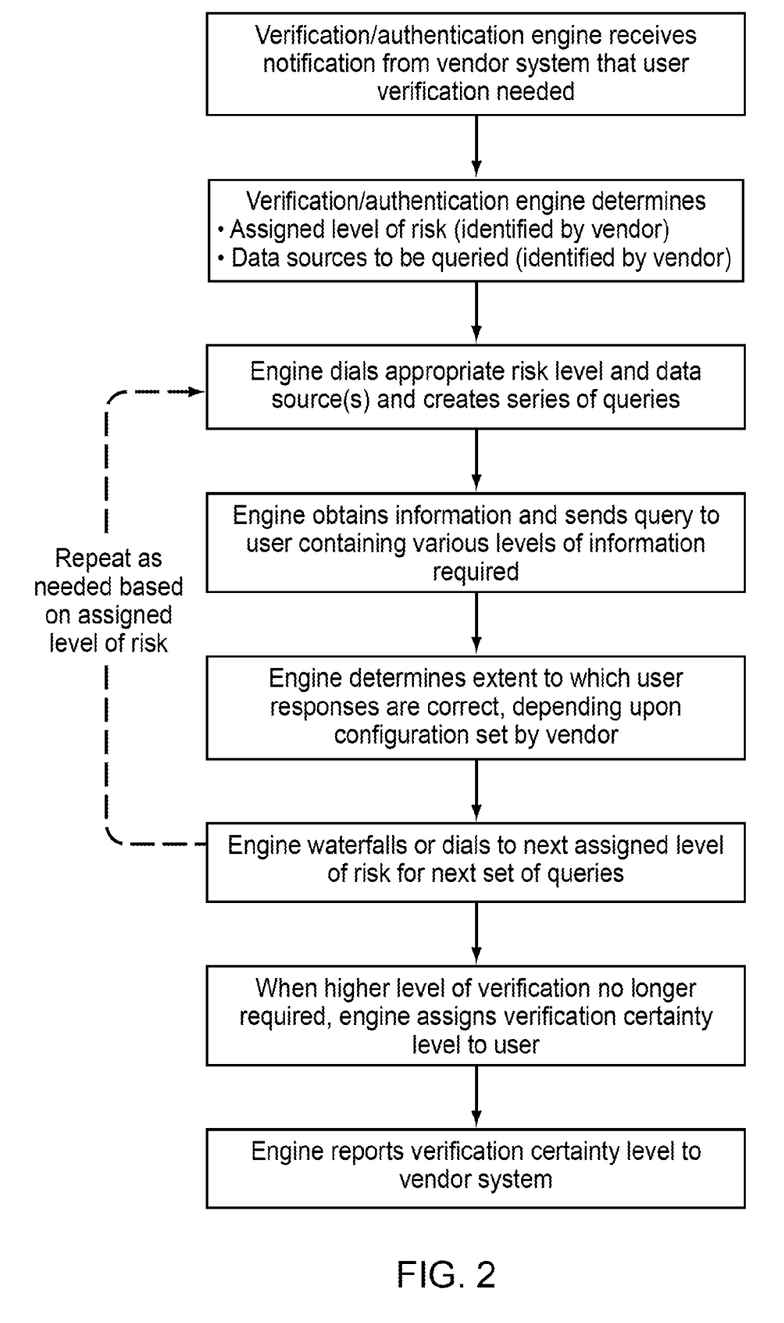
FIG. 2 is a flow chart for one form of overall processing for verifying and/or authenticating users according to one embodiment of the invention.
Figure 3:
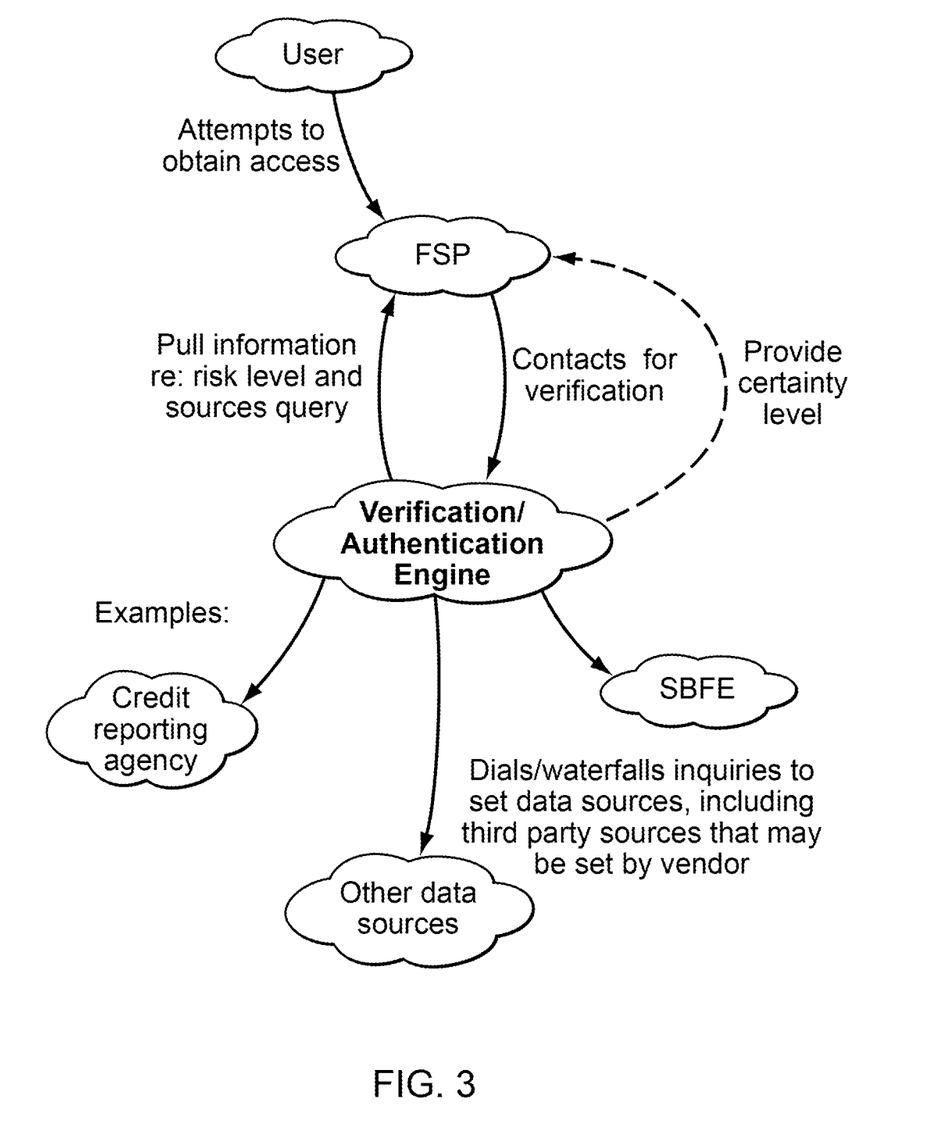
FIG. 3 is a schematic diagram showing information exchange for verifying and/or authenticating users according to one embodiment of the invention.

FIG. 2 shows the steps that may take place once a user attempts to access a vendor's transactions (which as discussed, can be various platforms, applications, and/or services related to information, financial transactions, information access, or any other event where authentication, verification, or other access control or security measures may be appropriate). When a user who wishes to apply for an online transaction accesses a vendor or client/server network through a client terminal, the server side of the network (or the vendor's site) communicates with a verification/authentication engine. The verification/authentication engine determines the level of verification that should be accorded to the user's identity based on rules specific to the vendor accepting the transaction.

Thus, the extent of the verification processing performed depends upon the nature of the transaction and the vendor-specific requirements. The vendor sets the assigned level of risk, and the verification/authentication engine locates appropriate questions and answers from appropriate sources that meet that assigned level of risk. The verification/authentication engine sends various questions to the user either through the vendor's website or the user can be re-directed to a separate site for the verification/authentication engine. In general, the user and accompanying credentials should be able to be passed from the login screen (portlet) to one or more target resources (databases) and/or verification locations. It is preferred that the verification/authentication engine serve as the common centralized portal for passing presented credentials to the appropriate location for verification, although other options are available and considered within the scope of this invention.

Generally, the user is verified and/or authenticated according to his/her ability to respond to successive queries for personal information, and the level of match is attained from comparing the information provided with reliable data sources. For example, the user may be initially requested to provide a first level of identification information, such as name, address, driver's license or other information that may be commonly carried on the person. This information is transmitted to the verification/authentication engine, which carries out a first level verification and/or authentication on that information by comparing the degree of match between the user-supplied information and known data about the user from other sources. At the completion of this first level verification and/or authentication process, the verification/authentication engine determines whether more questions are necessary depending upon the assigned level of risk.

Preferably, some of the additional questions are private information that only the user would know, such as e.g., mortgage lender, car payment, or other information obtained from a credit report or another source. Depending upon the risk level assigned and direction from the entity using the verification/authentication engine, questions are additionally pulled from other sources, as described above.

The private financial or other data elicited in the higher level(s) of the verification process may be requested using an interactive query, such as multiple choice questions, true/false questions, or questions requiring an input from the user that are automatically generated based upon the information available in the known data sources. The verification/authentication engine may access a credit file to identify loans of the user that are still in payback status. One or more loans may be selected, and the interactive query might ask the user for the lender's name or payment amount on the identified loan and offer a number of choices from which the user may select, only one of which is correct. Depending upon the responses, the user's identity may be verified. If a higher level of certainty is needed, the verification/authentication engine can pull additional questions from other sources.

One optional feature that may be provided is that the credentials used for verification can be made available to query on external profiling services containing information about the user's preferences (alert preferences, interests, products purchased, addresses, etc.).

Another optional feature is that the engine can search in multiple languages.

A further optional features is that a company can use this system internally. If there are changes to security policies at a company that, for example, require all users to re-verify and to answer more questions, the rules-based engine can be modified to accommodate the change. The engine can also enable the user to set rules for the various levels. For example, if an employee can only access the company intranet site, s/he may only have to re-verify once a year. If s/he is accessing confidential data, s/he may be required to re-verify every 90 days. When an employee is granted access to additional sources of information, that employee can have his/her profile modified accordingly. He or she would answer additional questions based on the new security level and be granted immediate access.

Once the querying process is complete, the verification/authentication engine may then deliver to the vendor or entity engaging the verification/authentication engine a confidence level or a percentage assurance about the identity of the user. For example, rather than providing an "accept" or "deny" command, the verification/authentication engine could provide a confidence level or percentage assurance, e.g., "85%" assurance that the user is who s/he says s/he is. Of course, it is also possible for the verification/authentication engine to simply provide an "accept" or "deny" command (or a yes/no command), and this could be based on a percentage comfort level set by the vendor. For example, if the percentage assurance is over 85% for a certain risk level, the vendor may authorize the verification/authentication engine to automatically grant access. The transaction the user is applying for is either carried out or not carried out (or other action taken) depending on the results of the authentication.

It is also possible for the vendor to dial the kind of scoring service it prefers. For example, it can decide what level of typographical error it will permit in its users' responses. For example, if a potential user were to type in an incorrect zip code for his/her address on file, the verification/authentication engine can be set to one of many options, such as re-querying the user (with a set number of times an incorrect answer can be presented before being locked out of the application or transaction) or (b) directly blocking the user immediately. As another example, each application at each risk level can have a set number of tries and if that number is exceeded, then the user can be permanently denied (until e.g., the database administrator re-sets the screen). Alternatively, there can be more sophisticated scoring models that can used. The general concept is that the vendor can identify its risk levels, including the confidence level and the scoring levels, it prefers to be used during the verification/authentication engine process.

Once the querying and verification and/or authentication process has been satisfied, the verification/authentication engine or other source may generate a digital certificate recording verification levels and other information related to the user. The digital certificate can then be presented in future transactions to avoid the need to re-verify the user for each new transaction event.

For example, if a digital certificate is to be issued once a user completes verification, the user may be directed to an appropriate issuing company, along with verification that the certificate should be issued. The user may be asked to input identification and challenge or password information to generate and store a digital certificate. If the user is a small business, the digital certificate could be issued to one person or to a group of people who are authorized to conduct transactions on the business' behalf. In short, the verification/authentication engine verifies the user and then transfers the user to another company (e.g., RSA or Verisign) to obtain the digital certificate. It should also be understood that other companies and/or data service providers can be involved, such biometric and/or token companies that can conduct verification via voice verification, fingerprint scans, retinal scans, DNA, or any other appropriate biometric or identifying characteristic. The below example describes and relates to a digital certificate, but it should be understood that other identifying characteristics may also be used. The example is equally applicable to other methods.

Briefly, a digital certificate typically contains a set of fields including user identification, a digital certificate serial number, an expiration period, as well as information related to the issuer of the digital certificate and fingerprint data for the digital certificate. It is preferably stored in a secure fashion on the client server and protected by user identification and challenge or password queries before the recipient can release the digital certificate for further transactions. A digital certificate may be a data file stored in common machine readable format that, upon proper release by the user, can be presented to other authentication servers for later transactions as evidence of identity. This helps avoid the need to re-authenticate the user for later events. Digital certificates contain an expiration field, but the certificate can also be generated to persist indefinitely.

Authentication providers (e.g., RSA, VeriSign, Business-Signatures, etc.) do not have the ability to provide verification, they only distribute devices for authentication. Accordingly, businesses of this type (or other third parties) may wish to access the verification/authentication engine so that authentication devices or tokens can be provided and used across multiple sites (bank 1, bank 2, insurance company 1, brokerage 1, etc.) or the verification/authentication engine may refer users who have been verified to such businesses. Additionally, a digital certificate that records a certain grade of confidence of the user's identity (as described above) may be issued, but to execute a sensitive transaction, the user may need to update and upgrade the digital certificate to a higher level of certainty regarding risk assurance.

It is also possible for the verification engine to be used to verify individuals or entities across multiple, possibly unrelated, websites. For example, Bank A will not accept a token from Bank B because Bank A is not aware of how and at what level the user at Bank B was verified. The verification/authentication engine could offer the ability to let the banks set those rules and risk levels such that the same token could be used across multiple sites. This eliminates the token necklace syndrome. The engine could verify users in real-time and provide a stamp/seal of approval or even distribute a token (e.g., via third party) to be used on various sites.

It is also possible for the verification approval status to have an expiration date. For example, the default could be set at one year from the data of approval. If a vendor would like a different expiration date to apply, that can be pre-set.

Various organizations have different objectives and motivations, and their business cases for verification are different. A customized business case for a specific organization may have different content and style, and may incorporate different aspects with different emphasis, focused on that particular organization. The design of embodiments of the verification/authentication engine described provides a single solution that meets multiple objectives and motivations. It is flexible enough to modify and configure solutions that meet changing and ongoing business requirements. It offers flexibility and ease of administration.

Small Business Uses:

Embodiments of the present invention also provide a system that can verify a user based on small business and commercial information and real-time aggregated data via the web to provide a dynamic verification solution. The system can include questions for small businesses, and answers to those questions and accompanying data sources can be identified and readily available so that enough information is generated to meet the security requirement. For example, SBFE and SBX files contain enough data to produce questions and answers based on many security requirements.

Aggregated Account Uses:

Embodiments of the invention provide a solution that provides access to information via the internet and proof of ownership via account aggregation. The aggregated accounts, which can be accessed via a single sign-on, are displayed to others to verify accuracy, authenticity, and ownership. The intent is to provide an inside view into one or more selected accounts. This could be useful if a user wishes to give a financial advisor access to all of his/her accounts at various financial institutions.

For example, a certain service may provide ability to peek at account information real-time online. It does not compromise integrity of account or disclose user ID and password. Existing aggregation users can identify those accounts that they wish to, or are required to share with the verification/authentication engine. Non-aggregation users may need to complete and set up that service prior to completing the verification process if the vendor has selected that as one of the sources from which to pull information.

While aggregation provides the ability to aggregate accounts and access them via a single sign-on, it does not currently enable the user to allow another entity to take a look inside the selected account to provide proof of ownership. This is why existing FSP verification applications have depended upon account-to-account transfers, which allow the user to transfer money real-time into a new account for funding purposes, thus establishing an instant relationship. Providing the ability to look into an online account without requiring the user to reveal his/her user ID and password or to make a deposit or account transfer is desirable. It would afford a higher level of verification, without compromising the existing security of the online account.

Embodiments also allow a real-time view into existing online information (financial, insurance, medical, etc.) for the potential customer—this ability to look into existing online accounts to verify proof of ownership and identification, and the ability to capture that information to supplement the file can be useful. For example, one service provides the ability to look into online financial accounts to provide proof for verification purposes and provides opportunity to capture that information. However, the limitation of some current systems is that they require the user to "opt in." In other words, the user can go to a single website and set up a single password in order to aggregate a number of accounts under that single password (e.g., Yodlee). However, in order to verify the user, the website that aggregates the data pulls information from the accounts that are identified by the user for verification. In other words, the account information available for verification is only the information from accounts identified by the user via opting in. By contrast, with the systems described herein, the information is pulled not necessarily from accounts identified by the user, but from accounts that are already tied to the user, such as a credit report. For example, a user does not identify or "opt in" to the use of identifying information being pulled from a company such as Equifax.

Similarly, even if a particular entity (e.g., a bank or a store) does not opt into the verification/authentication systems described, the engine may still have enough information to verify an account, e.g., the existence of a Store A credit card or an account at Bank B. In this example, the actual current balances may not be a part of the information that can be pulled, unless Store A or Bank B opts in and shares information with the system, but existence of an account can be verified through a credit reporting agency.

Certain products and services may require verification beyond basic questions and answers, or there may not be enough sources from which to obtain information. Therefore, accounts that are aggregated provide single sign-on access to multiple accounts online in real-time.

Embodiments of the verification/authentication engine described can develop relationships with current aggregation providers to gain access to information in order to generate questions and answers. The system may be able to capture this information, via screen scrape or direct feed for future need and/or to grow the user's file. It is preferred that the system can identify between new files (data) and label them as such so that self-reported files, captured files, and files provided from SBFE and other FSP sources do not get mixed up and can be identified accordingly.

Access at Similar Levels:

The system may also allow the user to return at any time and request access to additional solutions, applications, or services, while requiring him/her to answer only those additional questions that are applicable to the new transactions. In addition, a user may instantly access solutions that have similar verification requirements as other products and services for which the user has already been verified. Once approved for one, by default, a user may receive approval for others at similar levels. The level of approval, and access to applications associated with it, are based on risk models assigned to the application.

The system can also grant access to other systems and data that are assigned that same risk level, minimizing the number of times a user must be verified. In addition, if standards are established for an industry (e.g., banking or other FSPs), once verified and assigned a security token, the verification can be utilized at other locations.

It is also able to provide a user access to applications in different markets, i.e. consumer and small business markets, as long as the appropriate security levels are reached. For example, if a user has been verified and access granted to certain applications, and he/she wants to obtain access additional products and services, the verification/authentication engine can diagnose where the additional products are and display appropriate questions and answers based on those new applications and the risk associated with them. Likewise, if a user is verified for one application, that approval can cover other products and services that are available to the end user (e.g., on that grocery shelf or below). This eliminates the need to get verified for those services assigned the same risk level. In addition, if the user elects to add additional services later, he or she can simply continue on from where he or she left off.

Audit Trail and Documentation Requirements:

It may be desirable to provide an audit trail of documents, as well as what products and services they were used for verification (or attempted to be used for verification), and what information, down to actual questions that were asked. This information can be useful if the user requests applications that require additional verification or annual re-verification. For example, the file for each user being verified may have a flag by certain questions or types of information that can be checked, depending upon whether or not that type of information was used in the process. The engine can then store all verification questions asked.

With respect to other documentation issues:
applications and the risk level associated with them may be defined and documented;
if a third party is used for verification, documentation for using the service may be provided by the vendor;
the printed documentation may include:
Portal Operations Release Notes,
Installation and Configuration Guide,
Implementation Guide, and
Operations Guide.

Solutions may be documented for manual verification process.

verification standards may be documented so that applications know what to build for and so that the accompanying data bases and sources can be identified to meet those standards.

Other Uses:

The common service approach minimizes configuration and maintenance and provides consistency across multiple applications and market segments. The user can leverage the same data relationships and work from a common architecture and file structure. It can leverage common workflows, viewing and reporting capabilities, and most importantly, use a common administration framework (rules-based engine) for configuration that meets the needs of the specific market. For example:

| Market | Application | Drivers |
|---|---|---|
| Financial Service Providers | Access to banking, brokerage, mortgage, insurance, 401k, etc. | Reduce financial risk, identity theft, meet established guidelines |
| Retail | Order entry Personalized service | Reduce fraud Increase revenue (1:1 marketing) |
| Payment Solution Providers/POS | Verification of cardholder/check writer prior to payment transaction initiation | Reduce fraud, protect identity, minimize transaction fees |
| Employment/ Background Check/ Immigration | Verification of citizenship, legal status, whether credentials are legitimate (and not reused or those of a deceased individual), criminal record, monitoring | Meet legislature requirements (i.e. Senate Bill 529), improve hiring practice, monitor employees |
| Enterprise/IT Password Solution Providers | Access to Intranet, Extranet, Corporate Applications, Password/PIN resets | Increase security, reduce cost |
| Internet | Establish credentials, confirm identity | Reduce financial risk, identity theft, fraud |
| Healthcare | Access to patient information, authorize drug prescriptions, authorize insurance payments | Protect personal privacy, meet HIPPA requirements, reduce fraud and identity theft |
| Government/ Military | Access to guarded information, verification prior to disbursement of benefits | Increase security, reduce cost |
| Charitable Organization | Validate recipient prior to distribution of benefits | Reduce fraud, misappropriation of funds |

Generally, various embodiments described herein are useful for consumer verification, small business verification (to verify the principle grantor of the small business), employee-to-business verification (to confirm the identity of a user as an employee of the business), commercial verification (to establish confirmation of commercial businesses as well as employees); device verification (to validate that the device at the other end is in fact owned by the individual or business), as well as all forms of similar authentications.

Embodiments may also be used for quick start services, which use data for quick start and pre-populating bill payment and account aggregation services. Specifically, some embodiments provide the ability to populate information to expedite the account set up process for account aggregation. The system can verify the end user and then allow the user to select accounts they wish to aggregate. Pre-populating account information from, for example, an Equifax database into an aggregation setup process, account by account, can be a valuable time-saving service.

Embodiments may also be used for real-time verification, which facilitates the ability of an end user to prove proof of ownership by enabling him/her to enter information for an existing online account. These credentials are then passed to the applicable site where access is granted and data that resides on that site can be gathered to offer questions as part of the online verification process. Data and website login credential information can also be stored for later use.

Embodiments may also be used for social network verification, i.e., to verify users so that users of online social networks, i.e. MySpace.com, cannot pretend to be another. This can help minimize online predators.

Another potential use for various embodiments of the systems described are for debit or pre-paid cards, such as those issued by Red Cross or other entities in emergency situations (e.g., natural disaster relief). The cards are often issued to a particular person or family, and accordingly, confirming the identity of that person or family prior to accepting the card can help prevent fraud. The identifying information could be any practical information, depending upon the channel in which the card is being used. For example, if only a limited screen interaction is available, the information requested could be "Was this card issued in Alabama?" and the user could respond with a "yes/no" answer. If more screen interaction is available, the user may be prompted to enter certain digits of his/her social security number, claim number, zip code, and so forth. The Red Cross or issuing entity can identify the information needed (or risk level) and from what sources (e.g., the source in this example could be Red Cross' own database, although other sources are possible and could be dialed if needed based on risk level) prior to card acceptance.

Other options are for gift cards that have a pre-paid amount already associated with them (e.g., store cards, restaurant cards, etc.) If such cards are lost, they can be used by someone other than the intended recipient. Accordingly, the cards could be tied into a verification/authentication system that requires certain information to be inputted prior to accepting the card. The embodiments described are equally applicable to other options such as food stamps or other government (or otherwise) issued coupons in order to help prevent fraud.

Embodiments may also be used for a verification network that permits users to exchange information anonymously for verification purposes. This could allow contributors to perform verification by exchanging information real-time, while not compromising their agreements with their end users (to not share information with others as stated on their account agreements in accordance with the Gramm-Leach-Bliley act.)

Embodiments may also be used for payment verification. Prior to payment initiation (e.g., via check, POS or credit card), the system can be used to verify the individual in order to establish ownership of payment instrument. In short, the rules-based nature of the system is a dynamic solution that permits the vendor (or initial user of the verification/authentication engine service) to set what types of questions and data sources they wish to incorporate into the verification process. The engine can be set to meet the individual needs of the vendor and match the security needs of those applications being accessed.

Additional uses are described in each heading below. Any of these uses (described above and below) can be accessed via any of the channels described above (including one or more of the internet, an intranet, e-mail, instant messaging or other channels such as one or more of phone or voice systems, cell phones such as a Blackberry®, ATM, kiosk, scanner, point of sale terminal, mobile systems, handheld devices, pocket PC, wireless devices.)

These are merely examples, and it should be understood that other channels are possible and considered within the scope of this invention.

FFIEC Use:

Verification is more than confirming the identity of an individual, business, or employee of a business in order to open an account. Various embodiments of the verification/authentication engines described can be used for multi-form authentication and for identifying individuals prior to initiating or accepting a payment or as part of an employment hiring process.

To encourage FSPs to enhance their security, the Federal Financial Institutions Examination Council (FFIEC) published guidelines for authentication. The guidance highlights that verification is associated with authentication, but a separate process. It instructs FSPs to use dependable methods and sources of data, specifically third party, to open new accounts. The "Customer Verification Techniques" section of the FFIEC "Authentication in an Internet Banking Environment" document calls for the following:

Positive Verification—ensure that data provided by a user matches data from a trusted third party. Verify the identity via a question and answer interaction. Questions get more specific and detailed, thus increasing the certainty of positive verification.
   Logical Verification—make certain that data provided is accurate and consistent. Zip code and area code match with address, etc.
   Negative Verification—compare credentials against fraud databases to make sure data has not been linked to fraudulent activity.

POS Use:

Significant opportunity also exists for using the verification/authentication engines described within the point of sale (POS) and payments arena. There are four basic types of cards: debit, credit, smart, and pre-paid. There are three major types of authentication methods: voice, electronic data capture, and virtual terminals. Authentication is the area in which embodiment of the current invention can add significant value to the payment initiation process. During a transaction or payment, a card or check is presented for payment, virtual or physical. Information is captured from the card or check, via scanning, tapping, key entry or swiping, and the electronic data capture (EDC) process begins.

The data captured is presented to a processor and a decision of pay or no-pay is returned. While this checks for basic validity, it does not confirm that the card or check belongs to the individual. Even when a PIN or signature is required to complete the transaction, it still does not validate the person presenting the instrument for payment. As consumers demand more self-service checkout options and make more purchases virtually, additional security measures will be required. Efforts to minimize fraud, however, have been focused on detection at the backend. The solutions try to detect abnormal behavior and unusual activity. If credentialing were to occur on the front end, a large proportion of fraud could be eliminated. In fact, if the user could not answer the question, the transaction would not be sent. The verification/authentication engine design is such that the user, or business, could determine the dollar amount threshold they are comfortable with and only require verification on purchases above that amount. The card issuer can even set the type of questions based on the dollar amount, assigning risk accordingly. Having dynamic data and the ability to assign risk levels ensures that a legitimate purchaser has a better chance to complete the transaction and gain assurance that their card will not be used for fraudulent transactions.

This type of flexibility will benefit card issuers, especially since the card market has become so competitive. For example, some card issuers have a policy of "zero liability" for small business credit cards. It covers purchases made in stores, over the phone, or online. Accordingly, the verification/authentication engines described can be particularly useful in this area. Because the engine is dynamic and does not use just consumer credit report data, it cannot be compromised.

NACHA Use:

The National Automated Clearing House Association (NACHA) plans to test a new electronic payment solution that will position financial institutions to act as intermediaries for online transactions. This is similar to the PayPal and Verified by Visa payment models. The difference is that with PayPal, the end user must submit personal account information to PayPal prior to initiating a transaction.

The NACHA and Verified by Visa models add a password, and in some cases a personal message, to the transaction process. The cardholder enters their card information at checkout. A receipt with the personal message is presented back to the card holder to confirm that he/she is on a genuine site. If so, the user enters the password and the transaction is completed. The flaw with this system has been that the transaction is redirected to an online bank during the transaction. It forces the merchant to relinquish control of the transaction to another entity. This can confuse the user and has caused users to abandon the purchase prior to completion, causing a loss of sale for the merchant.

The verification/authentication engine described could eliminate this by verifying the user at the point of entering the card information. Verification would occur at the merchant site without any redirection, and offer better security than the above options. Because it is dynamic, the type of question could be matched to the transaction type and/or amount. It does not require the user to remember an additional password, and it does not compromise the transaction flow that the end user has often become accustomed to.

Mobile Device Use:

There are new security solutions introduced into the market everyday. One that has garnered some attention lately is out-of-band (OOB). OOB is a multi-factor solution that is used in conjunction with commonly available devices, like cell phones. It enables two-way communication via text or voice messaging. Because it operates out-of-band, it is separate from the primary channel (i.e. internet). It confirms the identity of the user and validity of the transaction and prevents man-in-the-middle attacks.

Out-of-band has a dependency on verifying the device to the user. This approach requires the end user to first enter device information during registration. It also blindly accepts that the number of that device belongs to that user. The best that OOB solution providers can offer today is to compare the user's data to what is known about that device, for example, geographic proximity or an area code and exchange combination relative to a zip code.

This, however, is a feeble attempt at fraud detection. OOB has been used by companies to verify new customers and existing account holders, and to detect when fraud or abnormal behavior is suspected. It is also used for specific transactions like payments, wires, and transfers. Rules can be established to dictate when OOB is to be applied. It can be set by transaction type or amount. This is compatible with the verification/authentication engine described. One primary difference is that the verification/authentication engine systems can verify that the device belongs to the individual or business before the pass code is sent. This is the missing piece for all OOB solutions being sold in the market today. Without verifying the device to the user, there is no way to be completely confident that the recipient of the pass code is the person the code is intended for.

Employment Use:

Legislators are expected to enact certain immigration bills in the near future. One is related to denying public benefits to adults who reside in the country illegally and to requiring public contractors to hire only workers who are lawfully in the country. Other Bills would require employers to verify the legal status and eligibility of employees, which means that employers would have to verify whether documentation presented by laborers is valid or not.

The Social Security Administration (SSA) offers a free service, Employee Verification System (EVS), which is a way to verify employee social security numbers (SSN). Users can call a toll-free number and check up to five SSNs per call. They can also submit up to 50 names and SSNs to the local Social Security office via paper or a magnetic tape listing. There are thousands of employers currently registered for this service, and in 2004 alone, the EVS fielded over a million calls. In 2005, the SSA rolled out an online application called Social Security Number Verification Service (SSNVS). This solution verifies employees' names and SSNs via a web graphical user interface. In 2005, the SSA processed 25.7 million verifications for over 12,000 employers.

The SSA also interacts with the Department of Homeland Security (DHS) Basic Pilot system. It assists employers with confirming employment eligibility for newly hired employees. It verifies a SSN, U.S. citizenship, and current work status, thereby confirming work authorization. DHS can also confirm current work authorization for all non-citizens. The combined total EVS, SSNVS, and Basic Pilot transactions in 2004 was approximately 67 million.

However, large companies are more likely to use these systems than smaller companies. Since the costs are fixed, the cost per use declines as the number of verifications per company increases. Many small businesses do not know about these resources or do not know how or where to access them. Using the verification/authentication engine described could make these systems available as a web service and provide universal access to small businesses. As a web service, the system could also distribute and integrate the solution into third party applications, i.e. payroll, accounting, and banking. The design allows the verifier to select which solutions match its business needs. The system can be deployed anywhere, and imbedded in applications that are required to run a small business or any size business (payroll, online banking, accounting, etc.)

Background Check Use:

Whether or not someone is hired for a job or promoted may depend on the information revealed in a background check. Job applicants and existing employees may be asked or required to submit to a background check. With the heightened focus on national security, the number of employment background checks being conducted has increased annually—as well as the reasons for conducting them. Solutions are now available that present automatic updates. As search technology advances and more federal, state, and local records become digitized, continuous screening could turn into a major market opportunity. The verification/authentication engine described is a tool that employers could use to minimize financial and legal risk. The verification/authentication engine and its ability to aggregate data from new and existing data sources, could be used in connection with background check offerings. It could also be used to tie employment verification and background checks and updates into e-recruitment solutions.

Most market segments will have primarily the same needs and characteristics. The main difference in the verification/authentication engine design will be the type of transaction and the risk associated it. For instance, transaction types will include the following:

Verification of identity prior to opening an account
Proof of identity prior to initiating a payment—POS or credit card
Confirmation of work eligibility and/or immigration status
Acknowledgement of ownership of mobile device A difference between the segments will be that payment and account opening customers will be transaction-centric while employment and device will be information-centric. It is important to note these differences because they will have an impact on the mobile/interactive channels that are integrated with the verification/authentication engine and their accompanying technologies.

From a customer perspective, consumers expect that companies that they interact with will protect not only their data, but also their identity. Research has indicated that users do not want to use tokens and other devices to authenticate themselves at a website. The preferred method is knowledge-based authentication. This method offers an added layer of security, as well as the ability to provide self-service functionality, such as password reset. One goal of various embodiments of this invention is to provide a utility platform that will be available to all products and applications, enabling them to deliver verification solutions to multiple market segments and their customers through multiple channels. In addition to making data more accessible, it will allow users to customize the solution to meet the needs of their individual markets.

Changes and modifications, additions and deletions may be made to the systems and methods recited above and shown in the drawings without departing from the scope or spirit of the invention and the following claims.

What is claimed is:

1. A method of controlling access by an entity to vendor information technology systems, the method comprising:
   receiving, by a verification/authentication engine executed on a server device, an inquiry from a vendor system to verify the entity for a transaction;
   determining, by the verification/authentication engine, that the entity is a small business rather than an individual;
   based on an identification of a channel through which the entity selects to access the vendor system, querying, by the verification/authentication engine, the entity using questions generated based on data from at least two data sources of a plurality of data sources containing information about the entity;
   determining, by the verification/authentication engine, at least one of a confidence level or a score based on the extent to which the entity correctly answers the questions; and
   sending, by the verification/authentication engine, the at least one of the confidence level or the score to the vendor system configured to determine whether to grant or deny access by the entity to the vendor system based on the at least one of the confidence level or the score.

2. The method of claim 1, further comprising determining a level of difficulty for the questions based on a channel type for the channel.

3. The method of claim 2, wherein determining the level of difficulty for the questions based on the channel type comprises:

determining that the channel type is a point-of-sale channel; and
increasing the level of difficulty based on the determining that the channel type is the point-of-sale channel.

4. The method of claim 1, further comprising determining that a risk level associated with the transaction requires verification via real-time data and wherein the at least two data sources include the real-time data.

5. The method of claim 1, further comprising:
generating the questions based on data about owners or principals of the small business.

6. The method of claim 5, further comprising generating a digital certificate for the entity based on determining that the entity is the small business, wherein the digital certificate comprises:
a verification level at which the entity was verified; and
an expiration date of the digital certificate,
wherein the digital certificate is capable of being stored on a user device and provided to a plurality of vendor systems.

7. The method of claim 5, further comprising
selecting, by the verification/authentication engine, an assigned level of risk for the transaction and a verification level to meet the assigned level of risk, wherein the assigned level of risk and the verification level are selected based on input received from the vendor system;
querying the entity based on the assigned level of risk and the verification level.

8. The method of claim 1, further comprising identifying a constraint associated with providing answers to the questions over the channel and selecting the data for generating the questions based on the constraint.

9. The method of claim 8, further comprising identifying a constraint associated with an input device via which answers are provided to the questions and selecting the data for generating the questions based on the constraint.

10. The method of claim 8, further comprising identifying a constraint associated with an output device via which the questions are displayed and selecting the data for generating the questions based on the constraint.

11. A method of controlling access by an entity to vendor information technology systems, the method comprising:
receiving, by a verification/authentication engine executed on a server device, an inquiry from a vendor system to verify the entity for a transaction;
determining, by the verification/authentication engine, that the entity is a small business rather than an individual;
selecting, by the verification/authentication engine, an assigned level of risk for the transaction and a verification level to meet the assigned level of risk, and a plurality of data sources containing information about the entity, wherein the assigned level of risk, the verification level, and the plurality of data sources are selected based on input received from the vendor system;
querying, by the verification/authentication engine, the entity using questions generated based on data from at least two data sources of the plurality of data sources, wherein the data describes owners or principals of the small business;
determining, by the verification/authentication engine, at least one of a confidence level or a score based on the extent to which the entity correctly answers the questions; and
sending, by the verification/authentication engine, the at least one of the confidence level or the score to the vendor system configured to determine whether to grant or deny access by the entity to the vendor system based on the at least one of the confidence level or the score.

12. The method of claim 11, further comprising querying the entity based on an identification of a channel through which the entity selects to access the vendor system.

13. The method of claim 12, further comprising determining a level of difficulty for the questions based on a channel type for the channel.

14. The method of claim 13, wherein determining the level of difficulty for the questions based on the channel type comprises:
determining that the channel type is a point-of-sale channel; and
increasing the level of difficulty based on the determining that the channel type is the point-of-sale channel.

15. The method of claim 11, further comprising determining that a risk level associated with the transaction requires verification via real-time data and wherein the at least two data sources include the real-time data.

16. A system comprising:
an authentication server capable of communicating with a vendor system, the authentication server comprising a verification/authentication engine configured for:
receiving an inquiry from the vendor system to verify an entity for a transaction;
determining that the entity is a small business rather than an individual;
based on an identification of a channel through which the entity selects to access the vendor system, querying the entity using questions generated based on data from at least two data sources of a plurality of data sources containing information about the entity;
determining at least one of a confidence level or a score based on the extent to which the entity correctly answers the questions; and
sending the at least one of the confidence level or the score to the vendor system configured to determine whether to grant or deny access by the entity to the vendor system based on the at least one of the confidence level or the score.

17. The system of claim 16, wherein the verification/authentication engine is further configured for:
determining that the channel is a point-of-sale channel; and
increasing a level of difficulty for the questions based on the determining that the channel is the point-of-sale channel.

18. The system of claim 16, wherein the verification/authentication engine is further configured for determining that a risk level associated with the transaction requires verification via real-time data and wherein the at least two data sources include the real-time data.

19. The system of claim 16, wherein the verification/authentication engine is further configured for:
generating the questions based on data about owners or principals of the small business.

20. The system of claim 19, wherein the verification/authentication engine is further configured for generating a digital certificate for the entity based on determining that the entity is the small business, wherein the digital certificate comprises:
a verification level at which the entity was verified; and
an expiration date of the digital certificate,
wherein the digital certificate is capable of being stored on a user device and provided to a plurality of vendor systems.

* * * * *

UNITED STATES PATENT AND TRADEMARK OFFICE
CERTIFICATE OF CORRECTION

PATENT NO.         : 8,793,777 B2
APPLICATION NO.    : 13/537437
DATED              : July 29, 2014
INVENTOR(S)        : Christen J. Colson It is certified that error appears in the above-identified patent and that said Letters Patent is hereby corrected as shown below:

On title page 2, in column 2, References Cited under "Other Publications", line 6, delete "(sepcifically" and insert -- (specifically --, therefor.

In the Specification

Column 4, line 15-16, delete "Receprocative" and insert -- Reciprocative --, therefor.

Column 6, line 49, delete "verification./authentication" and insert -- verification/authentication --, therefor.

Column 11, line 46, delete "with drawal" and insert -- withdrawal --, therefor.

Column 13, line 34, delete "can used." and insert -- can be used. --, therefor.

Column 17, line 3, delete "verification" and insert -- Verification --, therefor.

Column 17, line 40, delete "HIPPA" and insert -- HIPAA --, therefor.

Signed and Sealed this
Ninth Day of December, 2014

Michelle K. Lee
*Deputy Director of the United States Patent and Trademark Office*